(12) United States Patent
Harris et al.

(10) Patent No.: US 9,508,062 B2
(45) Date of Patent: Nov. 29, 2016

(54) PROBLEM MANAGEMENT RECORD PROFILING

(71) Applicant: International Business Machines Corporation, Armonk, NY (US)

(72) Inventors: Eric J. Harris, Vail, AZ (US); David C. Reed, Tucson, AZ (US); Max D. Smith, Tucson, AZ (US); Ryan J. Wisniewski, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 13/908,318

(22) Filed: Jun. 3, 2013

(65) Prior Publication Data
US 2014/0358953 A1 Dec. 4, 2014

(51) Int. Cl.
*G06F 7/00* (2006.01)
*G06Q 10/00* (2012.01)

(52) U.S. Cl.
CPC .................................. *G06Q 10/20* (2013.01)

(58) Field of Classification Search
None
See application file for complete search history.

(56) References Cited

U.S. PATENT DOCUMENTS

| 4,992,491 A | * | 2/1991 | Rieth | C08L 1/12 524/27 |
| 7,688,951 B1 | * | 3/2010 | Bajpay | H04M 3/08 379/15.05 |
| 7,984,007 B2 | | 7/2011 | Reumann et al. | |
| 2003/0065967 A1 | * | 4/2003 | Garcia | G06F 11/2257 714/1 |
| 2009/0310764 A1 | * | 12/2009 | Gerhart | G06Q 10/06 379/142.04 |
| 2010/0031095 A1 | | 2/2010 | Ruan et al. | |

* cited by examiner

*Primary Examiner* — Thu Nga Nguyen
(74) *Attorney, Agent, or Firm* — Robert J. Shatto; Robert Sullivan

(57) ABSTRACT

According to embodiments of the invention a method for servicing a problem management record are provided. The method may include creating a problem management record profile from information provided in a problem management record, wherein the information includes characteristics of a client computer system and symptoms of a problem. The method may also include comparing the profile to profiles of previously resolved problem management records to find a profile having at least one matching. The method may also include contrasting information used to obtain a solution to a problem of the previously resolved problem management record to the information provided in the problem management record, wherein information used to obtain a solution which is not provided in the information provided in the problem management record is classified as additional information. The method may also include collecting the additional information, wherein collecting includes searching documentation of the client computer system.

12 Claims, 2 Drawing Sheets

PROBLEM MANAGEMENT RECORD PROFILING

TECHNICAL FIELD

The present invention relates to the field of computer systems, and more specifically, to problem management computer systems that service problem management records.

BACKGROUND

Computer systems typically include a combination of computer programs and hardware, such as semiconductors, transistors, chips, circuit boards, storage devices, and processors. The computer programs are stored in the storage devices and are executed by the processors. A computer system may be purchased by a client from a manufacturer or distributor. The client may also rely on that manufacturer or distributor for customer support should any problem arise concerning the operation of the client computer system.

SUMMARY

According to embodiments of the invention, a method, a computer readable storage medium, and a computer system for servicing a problem management record are provided. The method may include creating a problem management record profile from information provided in a problem management record, wherein the information includes one or more characteristics of a client computer system and one or more symptoms of a problem with the client computer system. The method may also include comparing the problem management record profile to one or more profiles of previously resolved problem management records to find a previously resolved problem management record profile having at least one term matching a term in the problem management record profile. The method may also include contrasting, where a matching profile is found, information used to obtain a solution to a problem of the previously resolved problem management record to the information provided in the problem management record, wherein information used to obtain a solution to a problem of the previously resolved problem management record which is not provided in the information provided in the problem management record is classified as additional information. The method may also include collecting the additional information, wherein collecting includes searching documentation of the client computer system.

DETAILED DESCRIPTION

Figure 1:
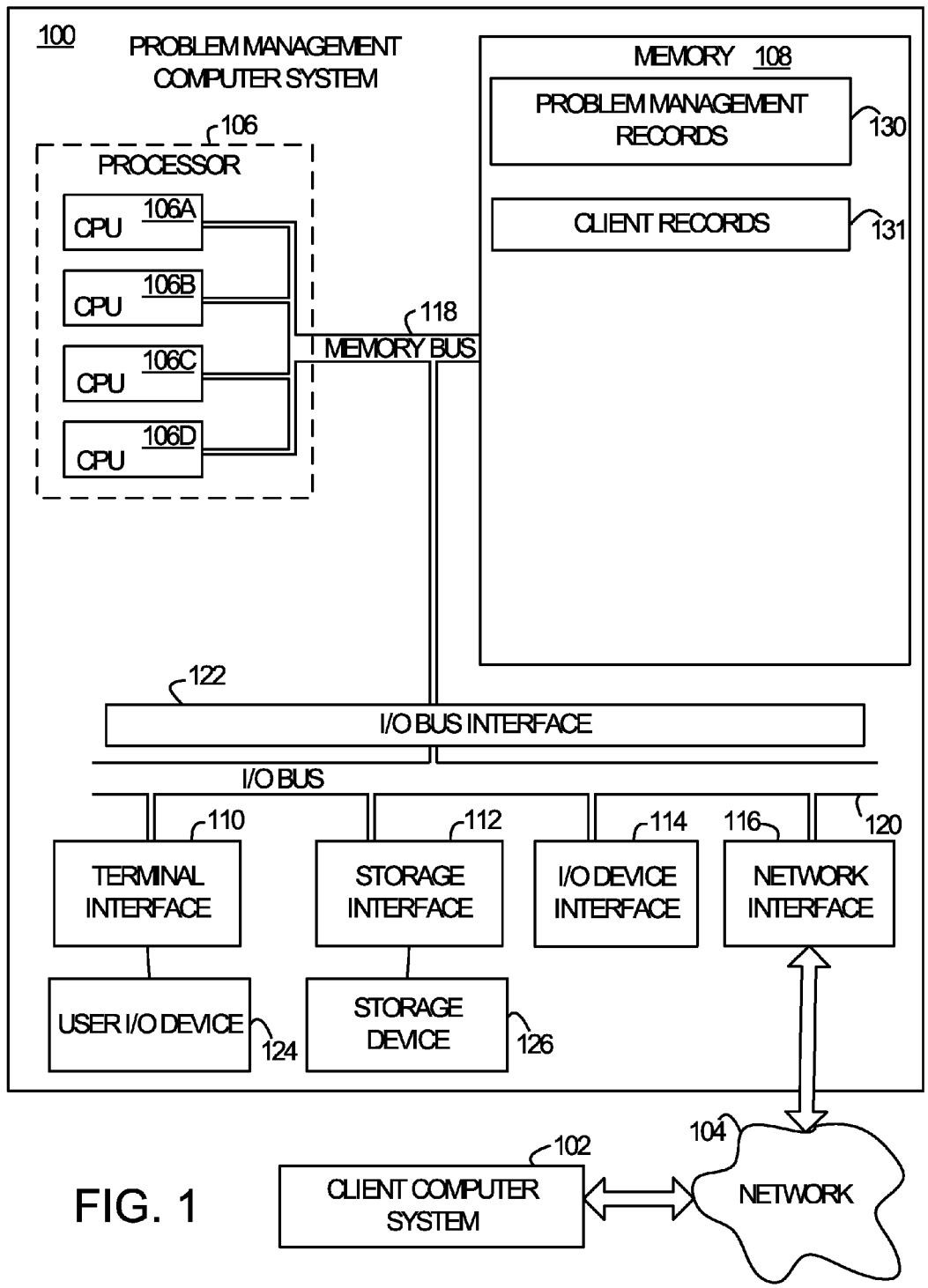
FIG. 1 depicts a high-level block diagram of an exemplary computer system for implementing an embodiment of the invention.

Typically, when a client computer system experiences a problem, it may require the assistance of a technical support representative (TSR). This assistance is usually initiated when the client contacts the TSR through a problem management system. The contact may create a problem management record (PMR). Initially, the PMR may contain information entered by the client pertaining to the particular problem they are experiencing. Once the client has completed this initial phase, the PMR may be placed in a queue in the problem management system for the next available TSR. Oftentimes, the PMR does not contain enough information to resolve the problem. This missing information may be additional information that is needed from the client, or it may be information that resides within the problem management system. In the case where the information needed is within the client system, the TSR will need to contact the client in order to get the information. This may lead to a series of communications between the TSR and the client in order to solve the problem. Due to response time, these communications may be time consuming.

In the case where the information needed is within the problem management system, the TSR may use the initial information provided by the client to conduct a search based on the symptoms of the problem and the characteristics of the client computer system. This search may include searching the clients previous PMRs and any other PMRs with similar symptoms or from similar computer systems. In both these cases, the process may be made more efficient by automatically gathering as much information as possible. This automation may be done as the client is initially filling out the PMR or it may be done after the client has submitted the PMR but before the PMR reaches the TSR.

Embodiments of the present invention are directed towards a problem management system which automatically collects information needed to resolve a problem reported within a problem management record (PMR). The problem management system may receive a report of a problem from a client computer system when the client computer system initiates a PMR. This report may include characteristics of the client computer system and symptoms of the problem the client computer system is experiencing. The problem management system may then use that information to construct a profile. This profile may then be used to compare the PMR to all previously reported or resolved PMRs within the problem management system. When a similar PMR is found, the problem management system may look at the particular problem of the resolved PMR and how it was solved to find any contrast between that information and the information provided in the current PMR. If any differences are found, the program management information may then collect that information from the client computer system by either searching the documentation of the client computer system, or by prompting the user of the client computer system to attach the information to the PMR.

Referring to the drawings, wherein like numbers denote like parts throughout the several views, FIG. 1 depicts a high-level block diagram representation of a problem management computer system 100 connected to a client computer system 102 via a network 104, according to an embodiment of the present invention. The terms "problem management" and "client" are used herein for convenience only, and in various embodiments a computer system that operates as a client computer in one environment may operate as a problem management computer in another environment, and vice versa. The mechanisms and apparatus of embodiments of the present invention apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122. The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode problem management records 130 and client records 131, hereafter collectively referred to as "stored programs and data." Although the stored programs and data are illustrated as being contained within the memory 108 in the computer system 100, in other embodiments some or all of them may be on different computer systems and may be accessed remotely, e.g., via the network 104. The computer system 100 may use virtual addressing mechanisms that allow the programs of the computer system 100 to behave as if they only have access to a large, single storage entity instead of access to multiple, smaller storage entities. Thus, while the stored programs and data are illustrated as being contained within the main memory 108, these elements are not necessarily completely contained in the same storage device at the same time. Further, although the stored programs and data are illustrated as being separate entities, in other embodiments some of them, portions of some of them, or all of them may be packaged together.

In an embodiment, the stored programs and data may include instructions or statements that execute on the processor 106 or instructions or statements that may be interpreted by instructions or statements that execute on the processor 106, to carry out the functions as further described below with reference to FIG. 2. In another embodiment, the stored programs and data, or two or more of these elements may be implemented in hardware via semiconductor devices, chips, logical gates, circuits, circuit cards, other physical hardware devices, or a combination of these devices in lieu of, or in addition to, a processor-based system. In an embodiment, the stored programs and data, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communication paths from the computer system 100 to other digital devices and computer systems 102; such paths may include, e.g., one or more networks 104.

Figure 2:
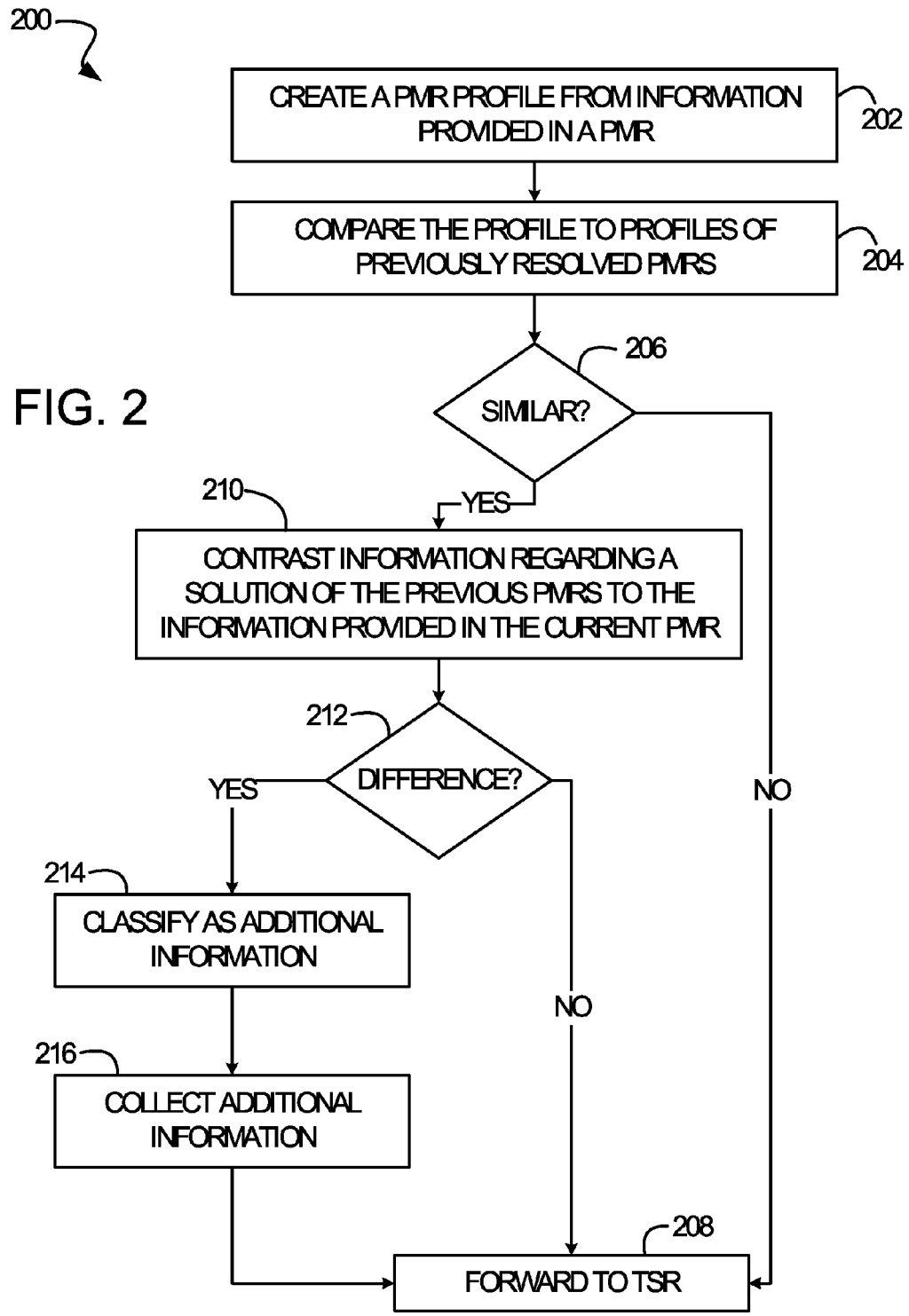
FIG. 2 depicts a flow chart of example process for servicing a problem management record, according to an embodiment of the invention.

FIG. 2 depicts a flow chart of example process 200 for servicing a problem management record, according to an embodiment of the invention. The process may be implemented on a problem management computer system 100 by executing computer instructions. The process 200 may be performed subsequent to the creation of a new PMR by the client computer system 102. The PMR may be created on the problem management computer system 100, or it may be created within the client computer system 102 and submitted to the problem management computer system 100 over the network 104. The PMR may include information containing characteristics of the client computer system 102 and symptoms of a problem with the client computer system 102.

The characteristics of the computer system 102 may include any information regarding the software and hardware present in the system 102, as well as any general information regarding the client's account. This information may not be specific to the problem and may be referred to as "header data." The header data may be entered into the PMR by the client 102 or it may be pulled from a client's record 131 within the problem management system 100. The PMR may also include an area where the client 102 and TSR may further communicate through plain text referred to as "PMR text." The PMR text area may include the symptoms of the problem with the client computer system 102. For example, if the client computer system 102 experiences a problem with particular software program which produces an error message with an error code, that information may be entered into the PMR text field.

At block 202, a PMR profile may be created from the information provided in the PMR. As previously stated, the PMR the information may include characteristics of a client computer system 102 and symptoms of a problem with the client computer system 102. A PMR profile may include system component or components, system release level, support contract information, and other pieces of information unique to the supported product or client's environment. The creation of this profile may be concurrent with the input of information into the PMR. For example, when a client 102 begins entering their account information into a PMR, the program management system 100 may begin to gather information regarding the client 102 from client records 131. This information may be within the program management system 100 and may be in addition to information provided in the PMR by the client 102. This information may then be used to immediately begin creating the profile. The program management system 100 may also reference the client records 131 to search for anything related to the symptoms of the problem inputted by the client 102 into the PMR text field. This search may also be conducted as the client 102 is entering the information so as to provide real-time feedback from the program management system 100 to the client system 102.

At block 204, the PMR profile may be compared to one or more profiles of previously resolved problem management records 130. This comparison may be done by comparing each term, or groups of terms, used to create the current PMR profile to each term, or groups of terms, used to create the profile of the resolved PMRs 130. This comparison may include first comparing the PMR profile to the profiles of the resolved PMRs from the client system 102. Once that comparison is done, the PMR profile may then be compared to all other resolved PMRs.

At block 206, a deciding operation may determine whether any resolved PMR profile is similar to the current PMR profile. This determination may be made by noting similarities in terms of the profiles from the comparison of block 204. In various embodiments, the profiles may be deemed similar if each contains one matching term. For example, the profiles may be similar if they contain the same error code. Other embodiments may require more than one matching term in order for the profiles to be similar. If the program management system 100 determines that there are no similar, resolved PMRs 130 then the process 200 may proceed to block 208 where the current PMR is forwarded to a TSR for further evaluation.

Returning to block 206, if the program management system 100 determines that there is one or more similar, resolved PMRs 130 then the process 200 may proceed to block 210 where information used to obtain a solution to a problem of the similar, resolved PMR is contrasted with the information provided in the current PMR. This contrast may be done to determine if there is a difference between information used to obtain a solution to the problem of the similar, resolved PMR and the information provided in the current PMR. An example of information used to obtain the solution to the problem of a resolved PMR may be a revision update to a software program, which is different than the revision for that software in the current PMR. Other examples include data logs such as system logs, job logs, log recording datasheets, or any other similar data log.

At block 212, a deciding operation may determine whether a difference between information used to obtain a solution to the problem of the similar, resolved PMR and the information provided in the current PMR exists. In various embodiments, this difference may be the inclusion of a single term in the resolved PMR which is not included in the current PMR. In other embodiments, the determination of a difference may require the absence of more than one term, or the absence of particular phrases. If there is no difference between information used to obtain a solution to the problem of the similar, resolved PMR and the information provided in the current PMR, then the process 200 may proceed to block 208 where the current PMR is forwarded to a TSR for further evaluation.

Returning to block 212, if there is a difference between information used to obtain a solution to the problem of the similar, resolved PMR and the information provided in the current PMR, then the process 200 may proceed to block 214 where the information which is present in the resolved PMR but not provided in the current PMR is classified as additional information. For example, if a data log of the system of the resolved PMR was used to solve the problem of the resolved PMR, and the corresponding data log was not included in the current PMR, then a the data log would be classified as additional information. Another example of additional information is documentation at a user site, such as a message manual or any other manual documenting the client computer system.

At block 216, the additional information may be collected. Collecting the additional information may include searching documentation of the client computer system 102. For example, if the additional information is a data log, or information within a data log, the problem management system 100 may search the client system 102 for the data log. In other embodiments, the problem management system 100 may not be able to locate the additional information, or may not have access to the additional information. In these instances, the problem management system 100 may prompt a user of the client computer system 102 to attach the additional information, such as the data log file, to the current PMR. The problem management system 100 may repeat steps 204 to 216 for each PMR within the problem management records 130. The process 200 may then proceed to block 208 where the current PMR is forwarded to a TSR for further evaluation.

Referring back to FIG. 1, in various embodiments, the computer system 100A may be a multi-user mainframe computer system, a single-user system, or a server computer or similar device that has little or no direct user interface, but receives requests from other computer systems (clients). In other embodiments, the computer system 100A may be implemented as a desktop computer, portable computer, laptop or notebook computer, tablet computer, pocket computer, telephone, smart phone, or any other appropriate type of electronic device. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100A and that, when read and executed by one or more processors in the computer system 100A, or when interpreted by instructions that are executed by one or more processors, cause the computer system 100A to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable storage medium. For example, a computer-readable storage medium may be, but not limited to, an electronic, magnetic, optical, electromagnetic, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A computer implemented method, comprising:
   executing computer instructions on a problem management computer system to perform the steps of:
   creating a problem management record profile from information provided in a problem management record, wherein the information provided includes one or more characteristics of a client computer system and one or more symptoms of a problem with the client computer system;
   comparing the problem management record profile to one or more profiles of previously resolved problem management records to find a previously resolved problem management record profile having at least one term matching a term in the problem management record profile;
   contrasting, where a matching profile is found, information used to obtain a solution to a problem of a previously resolved problem management record to the information provided in the problem management record;
   identifying, in response to the contrasting, additional information, the additional information being the information used to obtain a solution to the problem of the previously resolved problem management record which is not provided in the information provided in the problem management record; and
   collecting the additional information for the client computer system, wherein collecting includes searching documentation of the client computer system.

2. The method of claim 1, wherein the collecting the additional information further comprises prompting a user of the client computer system to attach a data log file to the problem management record.

3. The method of claim 1, wherein the information used to obtain a solution to the problem of the previously resolved problem management record includes a revision of a software program.

4. The method of claim 1, wherein the comparing the problem management record profile to the one or more profiles of previously resolved problem management records to find the previously resolved problem management record profile includes first comparing the problem management record profile to the one or more profiles of previously resolved problem management records regarding the client computer system.

5. A non-transitory computer readable storage medium having instructions stored thereon which, when executed, cause a processor to perform the following operations:
   creating a problem management record profile from information provided in a problem management record, wherein the information provided includes one or more characteristics of a client computer system and one or more symptoms of a problem with the client computer system;
   comparing the problem management record profile to one or more profiles of previously resolved problem management records to find a previously resolved problem management record profile having at least one term matching a term in the problem management record profile;
   contrasting, where a matching profile is found, information used to obtain a solution to a problem of a previously resolved problem management record to the information provided in the problem management record;
   identifying, in response to the contrasting, additional information, the additional information being the information used to obtain a solution to the problem of the previously resolved problem management record which is not provided in the information provided in the problem management record; and
   collecting the additional information for the client computer system, wherein collecting includes searching documentation of the client computer system.

6. The storage medium of claim 5, wherein the collecting the additional information further comprises prompting a user of the client computer system to attach a data log file to the problem management record.

7. The storage medium of claim 5, wherein the information used to obtain a solution to the problem of the previously resolved problem management record includes a revision of a software program.

8. The storage medium of claim 5, wherein the comparing the problem management record profile to the one or more profiles of previously resolved problem management records to find the previously resolved problem management record profile includes first comparing the problem management record profile to the one or more profiles of previously resolved problem management records regarding the client computer system.

9. A computer system including a processor and a memory encoded with instructions, wherein the instructions when executed on the processor perform the following operations:
   creating a problem management record profile from information provided in a problem management record, wherein the information provided includes one or more characteristics of a client computer system and one or more symptoms of a problem with the client computer system;
   comparing the problem management record profile to one or more profiles of previously resolved problem management records to find a previously resolved problem management record profile having at least one term matching a term in the problem management record profile;
   contrasting, where a matching profile is found, information used to obtain a solution to a problem of a previously resolved problem management record to the information provided in the problem management record;

identifying, in response to the contrasting, additional information in the previously resolved problem management record, the additional information being the information used to obtain a solution to the problem of the previously resolved problem management record which is not provided in the information provided in the problem management record; and collecting the additional information for the client computer system, wherein collecting includes searching documentation of the client computer system.

10. The computer system of claim 9, wherein the collecting the additional information further comprises prompting a user of the client computer system to attach a data log file to the problem management record.

11. The computer system of claim 9, wherein the information used to obtain a solution to the problem of the previously resolved problem management record includes a revision of a software program.

12. The computer system of claim 9, wherein the comparing the problem management record profile to the one or more profiles of previously resolved problem management records to find the previously resolved problem management record profile includes first comparing the problem management record profile to the one or more profiles of previously resolved problem management records regarding the client computer system.

* * * * *